US009467259B2

(12) United States Patent
Tandra et al.

(10) Patent No.: US 9,467,259 B2
(45) Date of Patent: Oct. 11, 2016

(54) METHODS AND APPARATUS FOR WIRELESS COMMUNICATION USING A MIXED FORMAT

(71) Applicant: QUALCOMM Incorporated, San Diego, CA (US)

(72) Inventors: Rahul Tandra, San Diego, CA (US); Sameer Vermani, San Diego, CA (US); Bin Tian, San Diego, CA (US); Lin Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 14/527,597

(22) Filed: Oct. 29, 2014

(65) Prior Publication Data

US 2015/0124745 A1    May 7, 2015

Related U.S. Application Data

(60) Provisional application No. 61/898,900, filed on Nov. 1, 2013.

(51) Int. Cl.
| | |
|---|---|
| *H04W 4/00* | (2009.01) |
| *H04L 5/00* | (2006.01) |
| *H04B 7/04* | (2006.01) |
| *H04L 27/26* | (2006.01) |
| *H04W 72/04* | (2009.01) |
| *H04L 27/00* | (2006.01) |

(52) U.S. Cl.
CPC ............. *H04L 5/003* (2013.01); *H04B 7/0452* (2013.01); *H04L 5/0007* (2013.01); *H04L 5/0023* (2013.01); *H04L 27/0008* (2013.01); *H04L 27/2601* (2013.01); *H04L 27/2602* (2013.01); *H04W 72/0453* (2013.01); *H04L 5/0069* (2013.01); *H04L 5/0094* (2013.01)

(58) Field of Classification Search
CPC ........ H04W 72/04; H04L 5/00; H04L 27/26; H04L 5/003; H04L 5/0007; H04L 27/0008; H04L 27/2601; H04B 7/0452
USPC ......................................................... 370/329
See application file for complete search history.

(56) References Cited

U.S. PATENT DOCUMENTS

| | | | |
|---|---|---|---|
| 2010/0309834 A1* | 12/2010 | Fischer | ............... H04B 7/0452 370/312 |
| 2010/0309868 A1 | 12/2010 | Yang | |
| 2011/0032875 A1* | 2/2011 | Erceg | ................... H04B 7/0452 370/328 |

OTHER PUBLICATIONS

Hart B., "DL-OFDMA-for-Mixed-Clients; 11-10-0317-01-00AC-DL-ofdma-FOR-mixed-clients",IEEE DR FT; 11-10-0317-01-00AC-DL-OFDMA-FOR-MIXED-CLIENTS, IEE-SA Mentor, Piscataway, NJ USA, vol. 802.11ac, No. 1, Mar. 16, 2010 (Mar. 16, 2010), pp. 1-24, XP017677327, [retrieved on 2010-03-16].
International Search Report and Written Opinion—PCT/US2014/063143—ISA/EPO—Jan. 26, 2015.

* cited by examiner

*Primary Examiner* — Sai-Ming Chan
(74) *Attorney, Agent, or Firm* — Knobbe Martens Olson & Bear LLP

(57) ABSTRACT

Methods and apparatus for multiple user communication are provided. In one aspect, method for wireless communication includes generating a packet comprising a multiple-user multiple-input multiple-output (MU-MIMO) portion and an orthogonal frequency division multiple access (OFDMA) portion. The method further includes transmitting the packet over a packet transmission frequency bandwidth.

26 Claims, 6 Drawing Sheets

METHODS AND APPARATUS FOR WIRELESS COMMUNICATION USING A MIXED FORMAT

CROSS REFERENCE TO RELATED APPLICATIONS

This application claims priority under 35 U.S.C. §119(e) to U.S. Provisional Patent Application No. 61/898,900 entitled "METHODS AND APPARATUS FOR WIRELESS COMMUNICATION USING A MIXED FORMAT" filed on Nov. 1, 2013 the disclosure of which is hereby incorporated by reference in its entirety.

BACKGROUND

1. Field

Certain aspects of the present disclosure generally relate to wireless communications, and more particularly, to methods and apparatus for multiple user communication in a wireless network.

2. Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send uplink communications to the access point or when an access point sends downlink communications to multiple terminals, it is desirable to minimize the amount of traffic to complete the uplink or downlink of all transmissions. Thus, there is a need for an improved protocol for transmissions to and from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication. The method comprises generating a packet comprising a multiple-user multiple-input multiple-output (MU-MIMO) portion and an orthogonal frequency division multiple access (OFDMA) portion. The method further comprises transmitting the packet over a packet transmission frequency bandwidth.

Another aspect of the disclosure provides an apparatus for wireless communication. The apparatus comprising a processor configured to generate a packet comprising a multiple-user multiple-input multiple-output (MU-MIMO) portion and an orthogonal frequency division multiple access (OFDMA) portion. The apparatus further comprising a transmitter configured to transmit the packet over a packet transmission frequency bandwidth.

Another aspect of the disclosure provides an apparatus for wireless communication. The apparatus comprising means for generating a packet comprising a multiple-user multiple-input multiple-output (MU-MIMO) portion and an orthogonal frequency division multiple access (OFDMA) portion. The apparatus further comprising means for transmitting the packet over a packet transmission frequency bandwidth.

Another aspect of the disclosure provides a non-transitory computer readable medium. The medium comprising instructions that when executed cause a processor to perform a method of generating a packet comprising a multiple-user multiple-input multiple-output (MU-MIMO) portion and an orthogonal frequency division multiple access (OFDMA) portion. The medium further comprising instructions that when executed cause a processor to perform a method of transmitting the packet over a packet transmission frequency bandwidth.

DETAILED DESCRIPTION

Figure 1:
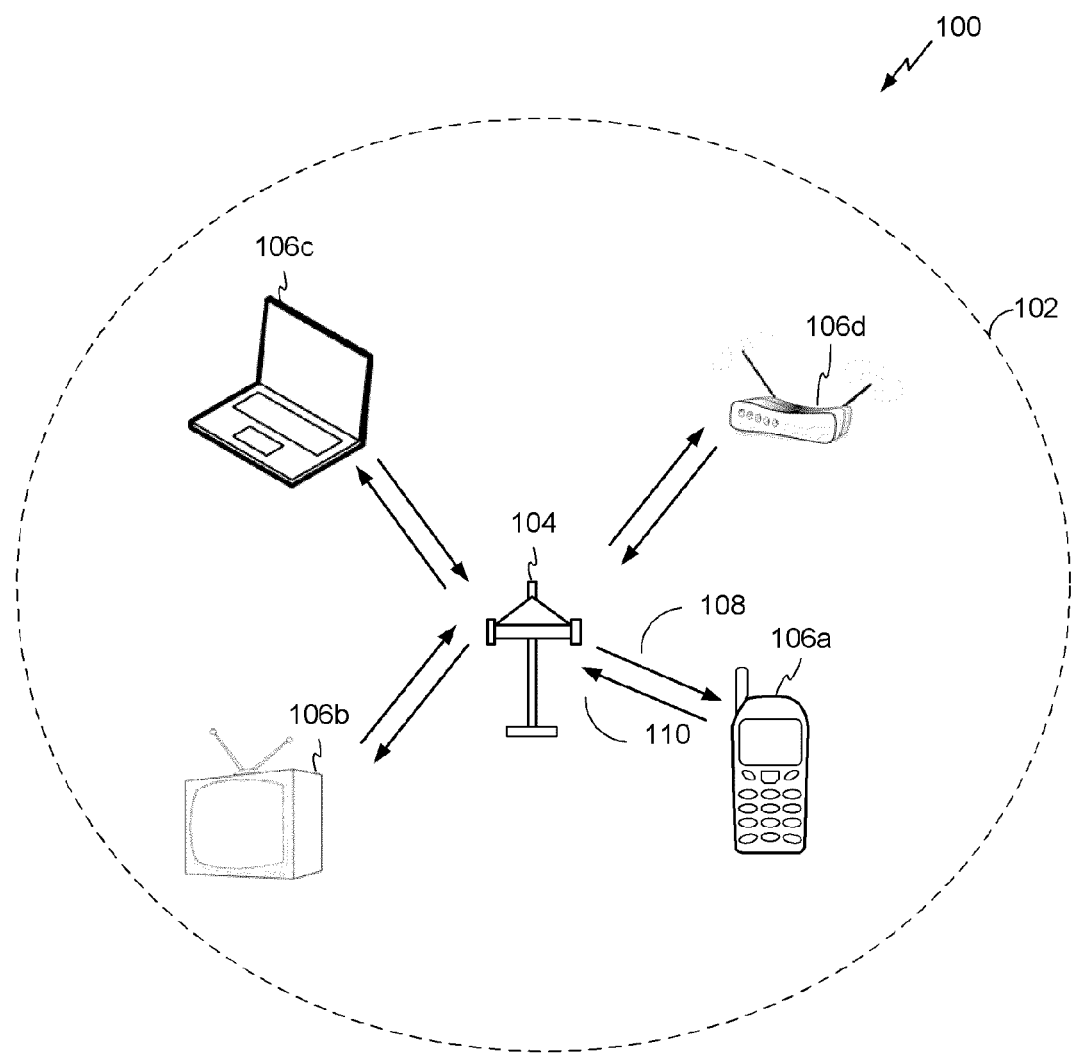
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example at least one of the 802.11ah, 802.11ac, 802.11n, 802.11g and 802.11b standards. The wireless communication system 100 may include an AP 104, which communicates with STAs 106.

A variety of processes and methods may be used for transmissions in the wireless communication system 100 between the AP 104 and the STAs 106. For example, signals may be transmitted and received between the AP 104 and the STAs 106 in accordance with OFDM/OFDMA techniques. If this is the case, the wireless communication system 100 may be referred to as an OFDM/OFDMA system. Alternatively, signals may be transmitted and received between the AP 104 and the STAs 106 in accordance with CDMA techniques. If this is the case, the wireless communication system 100 may be referred to as a CDMA system. Alternatively, signals may be transmitted and received between the AP 104 and the STAs 106 in accordance with multiple-user multiple-input multiple-output (MU-MIMO) techniques. If this is the case, the wireless communication system 100 may be referred to as a MU-MIMO system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
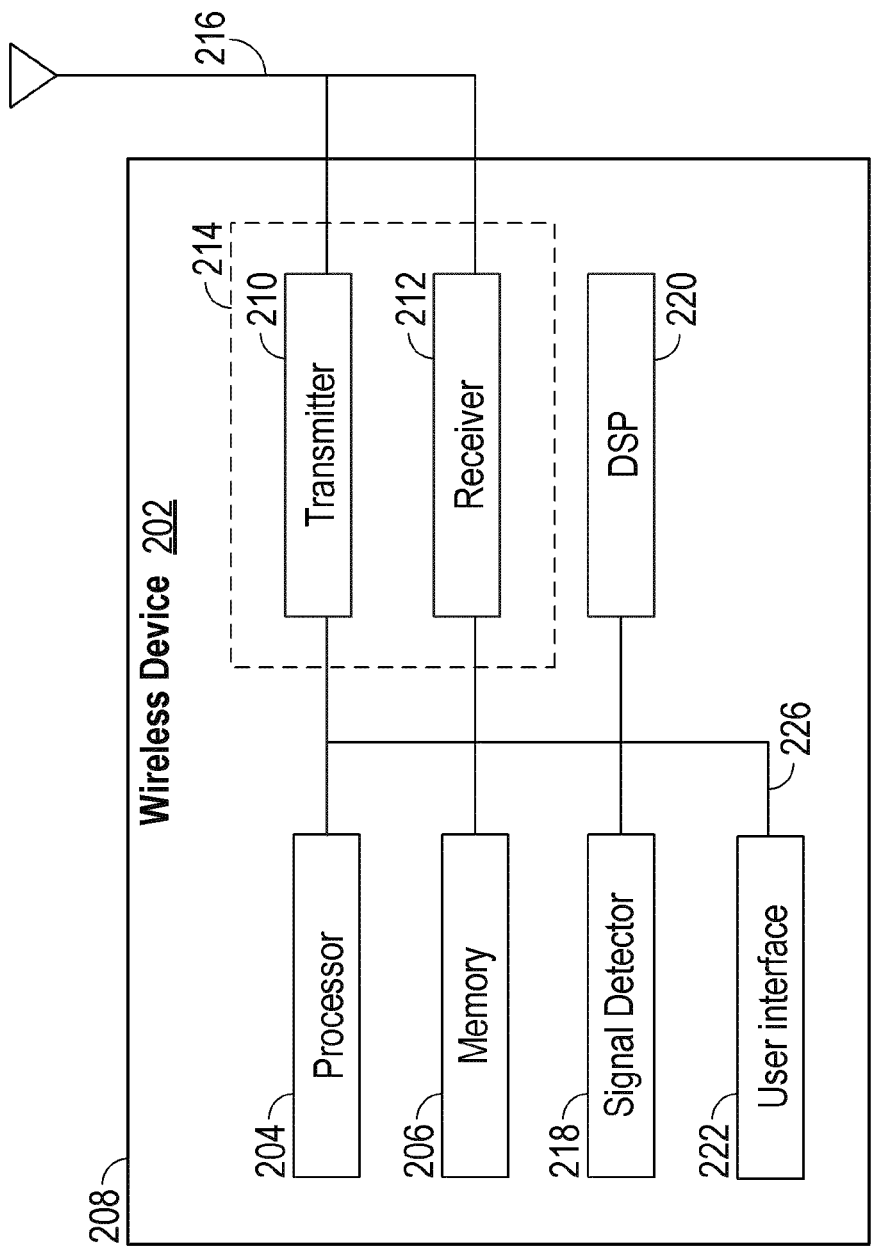
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas, which may be utilized during multiple-input multiple-output (MIMO) communications, for example.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or an STA 106, and may be used to transmit and/or receive communications. The communications exchanged between devices in a wireless network may include data units which may comprise packets or frames. In some aspects, the data units may include data frames, control frames, and/or management frames. Data frames may be used for transmitting data from an AP and/or a STA to other APs and/or STAs. Control frames may be used together with data frames for performing various operations and for reliably delivering data (e.g., acknowledging receipt of data, polling of APs, area-clearing operations, channel acquisition, carrier-sensing maintenance functions, etc.). Management frames may be used for various supervisory functions (e.g., for joining and departing from wireless networks, etc.).

Figure 4:
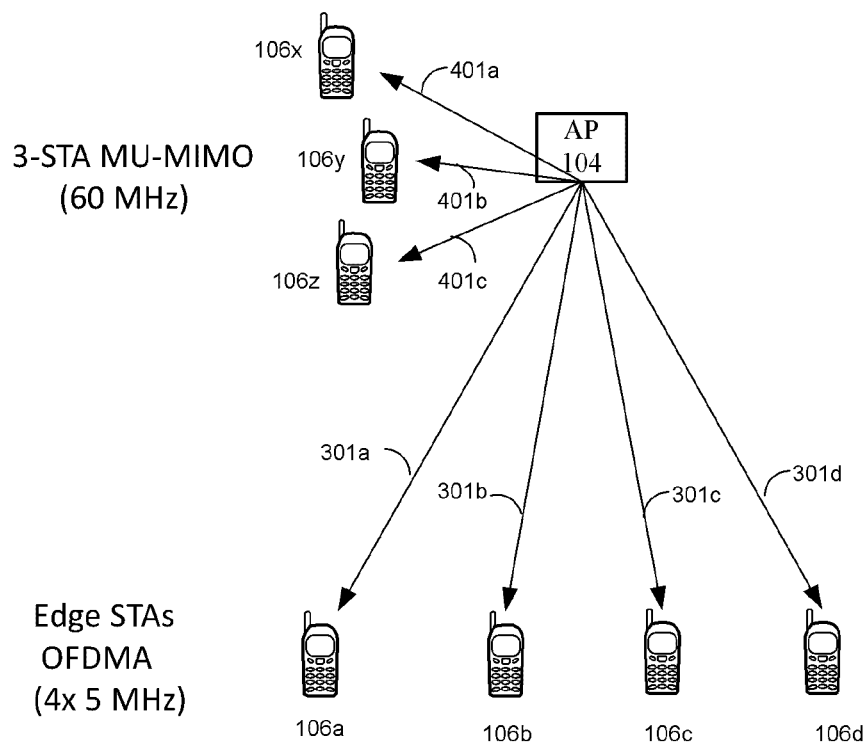
FIG. 4 illustrates a block diagram of an access point and stations in a mixed MU-MIMO and OFDMA system.

Certain aspects of the present disclosure support mixing MU-MIMO and OFDMA techniques in the frequency domain in a same PPDU. In some embodiments, a first portion of the PPDU frequency bandwidth may be transmitted as a MU-MIMO transmission and a second portion of the PPDU frequency bandwidth may be transmitted as an OFDMA transmission. Specifically, FIG. 4 illustrates MU-MIMO transmissions 401*a-c* and OFDMA transmissions 301*a-d*. In these embodiments, MU-MIMO or OFDMA transmissions can be sent simultaneously from an AP to multiple STAs and may create efficiencies in wireless communication.

Figure 3:
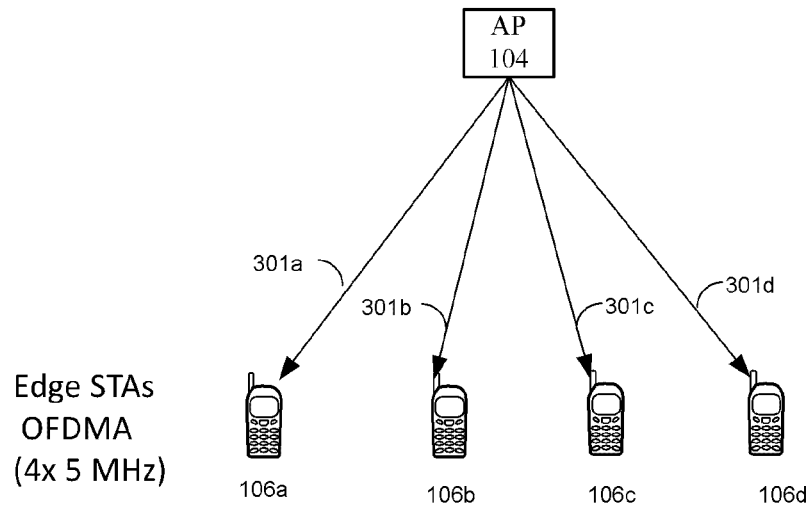
FIG. 3 illustrates a block diagram of an access point and stations in an OFDMA system.

In some embodiments, a portion of a frequency bandwidth may be used for OFDMA transmissions and the remaining portion of the frequency bandwidth may be used for MU-MIMO transmissions. FIG. 3 is a block diagram of an access point 104 and stations 106 in an OFDMA system. As shown in FIG. 3 and in conjunction with FIG. 1, the AP 104 and the STAs 106*a-d* are part of an 80 MHz BSS. In this embodiment, the STAs 106*a-d* are located at the edge of the BSS and have one 20 MHz channel that is available. The AP 104 may send the STAs 106*a-d* an OFDMA transmission over the 20 MHz channels (i.e. OFDMA transmissions 301*a-301d*). The remaining 60 MHz bandwidth may be unavailable because of overlapping basic service set (OBSS) interference. FIG. 4 is a block diagram of the AP 104 and the STAs 106*a-d* and 160*x-z* in a mixed MU-MIMO and OFDMA system. In this embodiment, the STAs 106*a-d* have one 20 MHz channel that is available as in FIG. 3 and the AP 104 may send OFDMA transmissions 301*a-d* to the STAs 106*a-d* over the 20 MHz channel. In this aspect, the AP 104 may also send MU-MIMO transmissions 401*a-c* to STAs 106*x-z* that are located close to the AP 104 over the remaining 60 MHz portion of the bandwidth. By sending an MU-MIMO packet to the STAs 106*x-z* over the previously un-used 60 MHz portion of the bandwidth, the AP 104 may increase throughput by using a combination of OFDMA and MU-MIMO transmissions.

Figure 5:
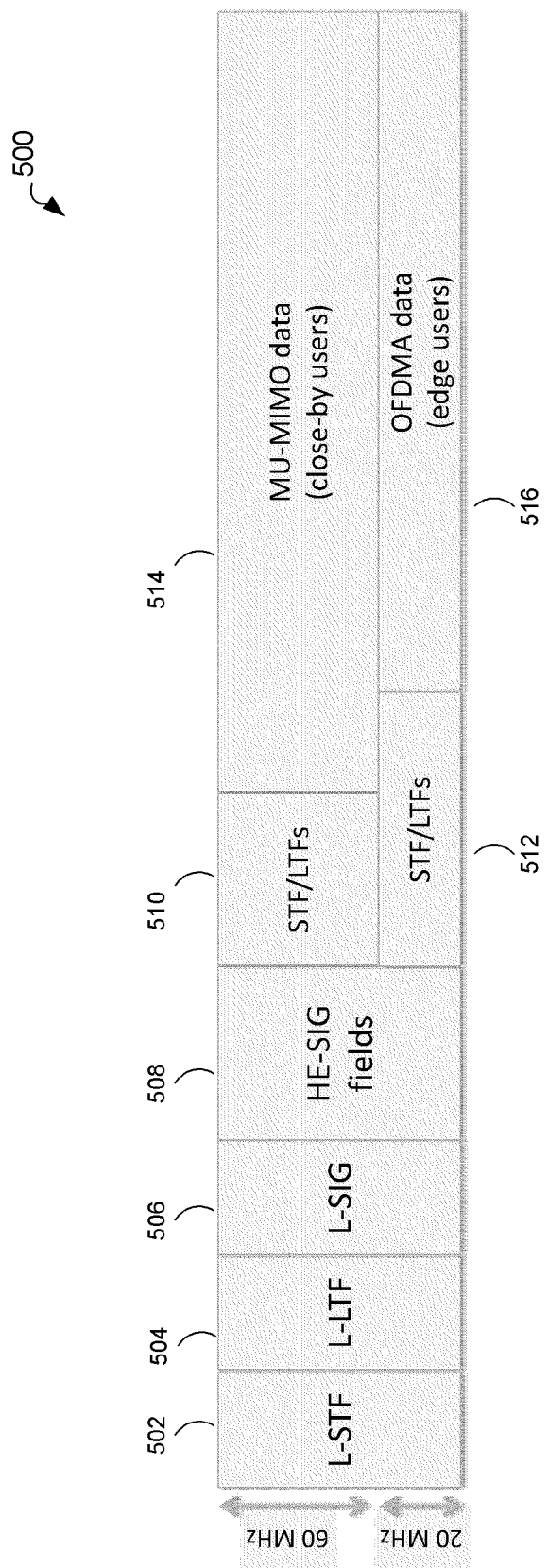
FIG. 5 shows a diagram of one embodiment of a physical layer data unit (PPDU) packet format containing a mixture of MU-MIMO and OFDMA portions.

FIG. 5 is a diagram of an embodiment of a mixed physical layer data unit (PPDU) 500 packet format including OFDMA and MU-MIMO portions. Such a mixed PPDU may be transmitted by a wireless device, such as an AP 104. PPDU 500 may comprise a legacy portion, which includes legacy fields: legacy short training field (L-STF) 502; legacy long training field (L-LTF) 504; and legacy signal field (L-SIG) 506. The legacy fields 502, 504, and 506 may be duplicated in every 20 MHz channel. PPDU 500 may also comprise a high-efficiency signal field (HE-SIG) 508 which contains certain signaling information for the PPDU 500. In some embodiments, the HE-SIG 508 may contain a bit to indicate that the PPDU 500 contains both MU-MIMO and OFDMA portions. The HE-SIG 508 may also contain stream allocation (for MU-MIMO STAs) and tone allocation (for OFDMA STAs) information. As shown in FIG. 5, the MU-MIMO portion of the PPDU 500 packet is in the top 60 MHz of the bandwidth and the MU-MIMO portion contains a STF/LTFs field 510 and a MU-MIMO data portion 514. The OFDMA portion of the PPDU 500 packet is in the bottom 20 MHz of the bandwidth and contains a STF/LTFs field 512 and a OFDMA data portion 516. While as shown in FIG. 5, the STF/LTFs field 512 is larger than the STF/LTFs field 510, either field STF/LTFs 510 or 512 may be any size such that in some embodiments, STF/LTFs field 510 may be larger or equal to STF/LTFs field 512. When transmitting a PPDU 500 packet an AP 104 may allocate part of its transmit power to transmit the MU-MIMO portion (fields 510 and 514) and the remaining transmit power may be used to transmit the OFDMA portion (fields 512 and 516).

Figure 6:
FIG. 6 shows a diagram of one embodiment of a few relevant fields of a signal field in a mixed PPDU.

As discussed in connection with FIG. 5, a HE-SIG field 508 may signal the allocation of STAs across the MU-MIMO and OFDMA portions of the PPDU 500 packet frequency bandwidth. FIG. 6 is a diagram of one embodiment of some relevant fields of a HE-SIG field 600 in a mixed PPDU format. The HE-SIG field 600 may comprise a two-bit field 601 to indicate the packet bandwidth. The HE-SIG field 600 may also comprise a one-bit field 602 to indicate whether the transmission of the packet contains a transmission of both MU-MIMO and OFDMA portions or not. The HE-SIG field 600 may also comprise a one-bit field 604 to indicate whether the MU-MIMO portion is in the top portion of the bandwidth or not. The HE-SIG field 600 may also comprise a four-bit field 606 to indicate the frequency bandwidth of the MU-MIMO portion of the packet. In some embodiments, the MU-MIMO portion may be anywhere from 20-160 MHz and the remaining bandwidth may be allocated for the OFDMA portion. In some embodiments, the frequency bandwidth of the MU-MIMO and OFDMA portions of the PPDU may be multiples of 20 MHz. The HE-SIG field 600 may also comprise a six-bit group identifier (GID) field 608 to indicate the group of STAs for the MU-MIMO portion and a six-bit GID field 610 to indicate the group of STAs for the OFDMA portion.

Figure 7:
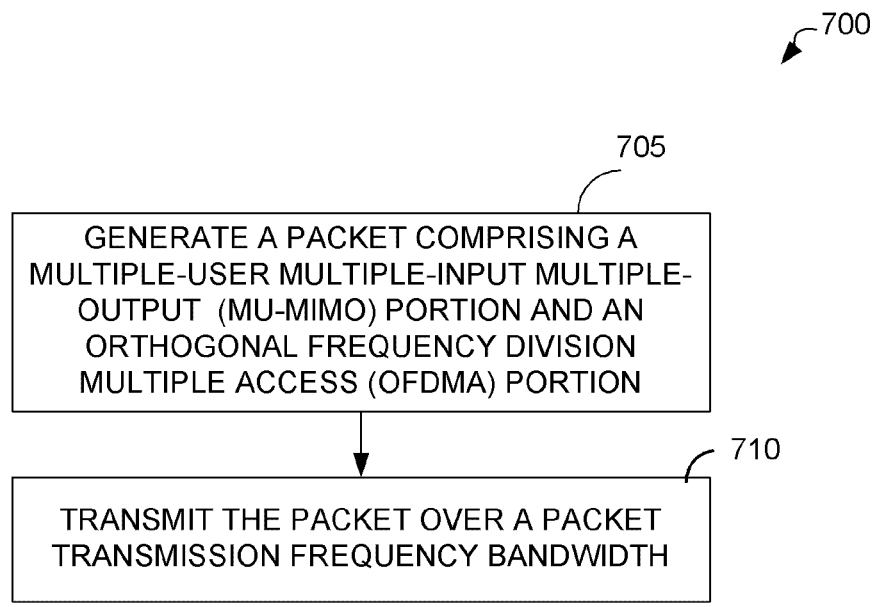
FIG. 7 is a flow chart of an aspect of an exemplary method for providing wireless communication.

FIG. 7 is a flow chart of an exemplary method 700 for wireless communication in accordance with certain embodiments described herein. The method 700 may be used to generate and transmit any of the packets described above. The packets may be transmitted by the AP 104 to one or more of the STAs 106*a*-106*d* shown in FIG. 1. In addition, the wireless device 202 shown in FIG. 2 may represent a more detailed view of the AP 104, as described above. Thus, in one implementation, one or more of the steps in flowchart 500 may be performed by, or in connection with, a processor and/or transmitter, such as the processor 204 and transmitter 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

In operation block 705, the AP 104 may generate a packet comprising a multiple-user multiple-input multiple-output (MU-MIMO) portion and an orthogonal frequency division multiple access (OFDMA) portion. In operational block 710, the AP 104 may transmit the packet over a packet transmission frequency bandwidth.

In some embodiments, the method 700 of FIG. 7 may be performed by an apparatus for wireless communication, in accordance with certain embodiments described herein. The apparatus may comprise means for generating a packet comprising a multiple-user multiple-input multiple-output (MU-MIMO) portion and an orthogonal frequency division multiple access (OFDMA) portion. In some embodiments, the means for generating may comprise the processor 204 or DSP 220. The apparatus may further comprise means for transmitting the packet over a packet transmission frequency bandwidth. In some embodiments, the means for transmitting may comprise the transmitter 210.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:
1. A method for wireless communication, comprising:
   generating a packet comprising a multiple-user multiple-input multiple-output (MU-MIMO) portion, an orthogonal frequency division multiple access (OFDMA) portion, and a signal (SIG) field, wherein the SIG field indicates a frequency bandwidth location for the MU-MIMO portion within the packet transmission frequency bandwidth; and transmitting the packet over a packet transmission frequency bandwidth.

2. The method of claim 1, wherein the transmitting comprises transmitting the MU-MIMO portion of the packet over a portion of the packet transmission frequency bandwidth and the OFDMA portion of the packet over a remaining portion of the packet transmission frequency bandwidth.

3. The method of claim 1, wherein the SIG field indicates whether the transmission of the packet is containing the MU-MIMO and OFDMA portions.

4. The method of claim 3, wherein a format of a field in the SIG field is based at least in part on whether the transmission of the packet is containing the MU-MIMO and OFDMA portions.

5. The method of claim 1, wherein the SIG field indicates a frequency bandwidth of the transmission of the MU-MIMO portion.

6. The method of claim 1, wherein the SIG field comprises a group identifier field indicating a group of stations intended to receive the transmission of the MU-MIMO portion.

7. The method of claim 1, wherein the SIG field comprises a group identifier field indicating a group of stations intended to receive the transmission of the OFDMA portion.

8. An apparatus for wireless communication comprising:
a processor configured to generate a packet comprising a multiple-user multiple-input multiple-output (MU-MIMO) portion, an orthogonal frequency division multiple access (OFDMA) portion, and a signal (SIG) field, wherein the SIG field indicates a frequency bandwidth location for the MU-MIMO portion within the packet transmission frequency bandwidth; and
a transmitter configured to transmit the packet over a packet transmission frequency bandwidth.

9. The apparatus of claim 8, wherein the transmitter is further configured to transmit the MU-MIMO portion of the packet over a portion of the packet transmission frequency bandwidth and the OFDMA portion of the packet over a remaining portion of the packet transmission frequency bandwidth.

10. The apparatus of claim 8, wherein the SIG field indicates whether the transmission of the packet is containing transmission of MU-MIMO and OFDMA portions.

11. The apparatus of claim 10, wherein a format of a field in the SIG field is based at least in part on whether the transmission of the packet is containing the transmission of the MU-MIMO and OFDMA portions.

12. The apparatus of claim 8, wherein the SIG field indicates a frequency bandwidth of the transmission of the MU-MIMO portion.

13. The apparatus of claim 8, wherein the SIG field comprises a group identifier field indicating a group of stations intended to receive the transmission of the MU-MIMO portion.

14. The apparatus of claim 8, wherein the SIG field comprises a group identifier field indicating a group of stations intended to receive the transmission of the OFDMA portion.

15. An apparatus for wireless communication comprising:
means for generating a packet comprising a multiple-user multiple-input multiple-output (MU-MIMO) portion, an orthogonal frequency division multiple access (OFDMA) portion, and a signal (SIG) field, wherein the SIG field indicates a frequency bandwidth location for the MU-MIMO portion within the packet transmission frequency bandwidth; and
means for transmitting the packet over a packet transmission frequency bandwidth.

16. The apparatus of claim 15, wherein means for transmitting is further configured to transmit the MU-MIMO portion of the packet over a portion of the packet transmission frequency bandwidth and the OFDMA portion of the packet over a remaining portion of the packet transmission frequency bandwidth.

17. The apparatus of claim 15, wherein the SIG field indicates whether the transmission of the packet is containing transmission of MU-MIMO and OFDMA portions.

18. The apparatus of claim 17, wherein a format of a field in the SIG field is based at least in part on whether the transmission of the packet is containing the transmission of the MU-MIMO and OFDMA portions.

19. The apparatus of claim 15, wherein the SIG field indicates a frequency bandwidth of the transmission of the MU-MIMO portion.

20. The apparatus of claim 15, wherein the SIG field comprises a first group identifier field indicating a first group of stations intended to receive the transmission of the MU-MIMO portion, wherein the SIG field comprises a second group identifier field indicating a second group of stations intended to receive the transmission of the OFDMA portion.

21. A non-transitory computer readable medium comprising instructions that when executed cause a processor to perform a method of:
generating a packet comprising a multiple-user multiple-input multiple-output (MU-MIMO) portion, an orthogonal frequency division multiple access (OFDMA) portion, and a signal (SIG) field, wherein the SIG field indicates a frequency bandwidth location for the MU-MIMO portion within the packet transmission frequency bandwidth; and
transmitting the packet over a packet transmission frequency bandwidth.

22. The medium of claim 21, wherein transmitting the packet comprises transmitting the MU-MIMO portion of the packet over a portion of the packet transmission frequency bandwidth and the OFDMA portion of the packet over a remaining portion of the packet transmission frequency bandwidth.

23. The medium of claim 21, wherein the SIG field indicates whether the transmission of the packet is containing transmission of MU-MIMO and OFDMA portions.

24. The medium of claim 23, wherein a format of a field in the SIG field is based at least in part on whether the transmission of the packet is containing the transmission of the MU-MIMO and OFDMA portions.

25. The medium of claim 21, wherein the SIG field indicates a frequency bandwidth of the transmission of the MU-MIMO portion.

26. The medium of claim 21, wherein the SIG field comprises a first group identifier field indicating a first group of stations intended to receive the transmission of the MU-MIMO portion, wherein the SIG field comprises a second group identifier field indicating a second group of stations intended to receive the transmission of the OFDMA portion.

* * * * *